2 Sheets—Sheet 1.

J. M. PFAUDLER.
Apparatus for Regulating the Pressure in a Series of Fermenting Vessels.

No. 205,572. Patented July 2, 1878.

WITNESSES:
Francis McArdle.
C. Sedgwick

INVENTOR:
J. M. Pfaudler
BY Munn & Co
ATTORNEYS.

2 Sheets—Sheet 2.

J. M. PFAUDLER.
Apparatus for Regulating the Pressure in a Series of Fermenting Vessels.

No. 205,572. Patented July 2, 1878.

WITNESSES:
Francis McArdle
C. Sedgwick

INVENTOR:
J. M. Pfaudler
BY Munn & Co
ATTORNEYS.

UNITED STATES PATENT OFFICE.

JOHN M. PFAUDLER, OF ROCHESTER, NEW YORK.

IMPROVEMENT IN APPARATUS FOR REGULATING THE PRESSURE IN A SERIES OF FERMENTING-VESSELS.

Specification forming part of Letters Patent No. 205,572, dated July 2, 1878; application filed June 8, 1878.

*To all whom it may concern:*

Figure 1:
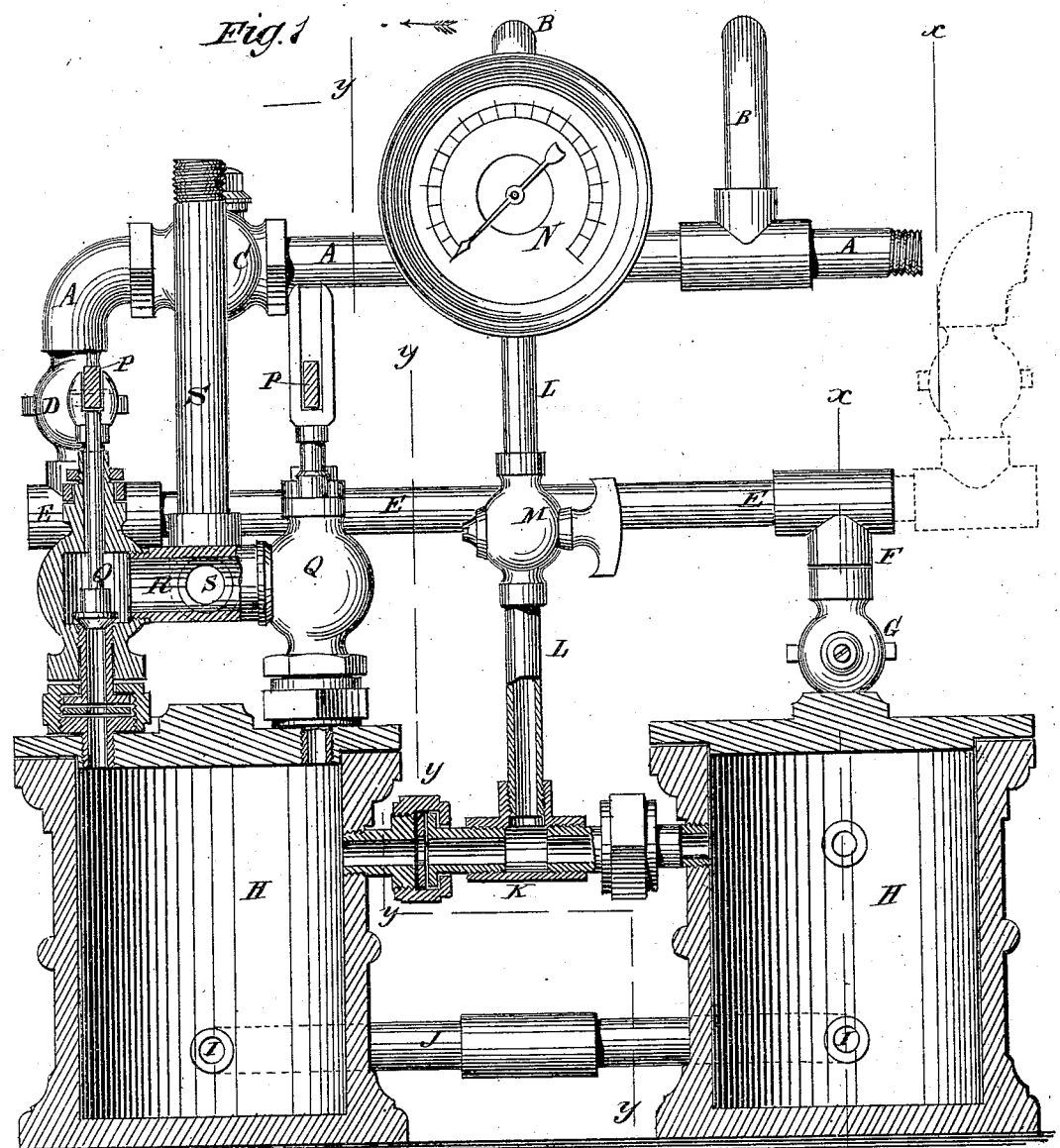
Figure 2:
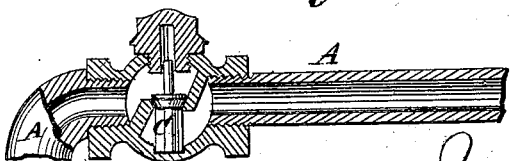
Figure 3:
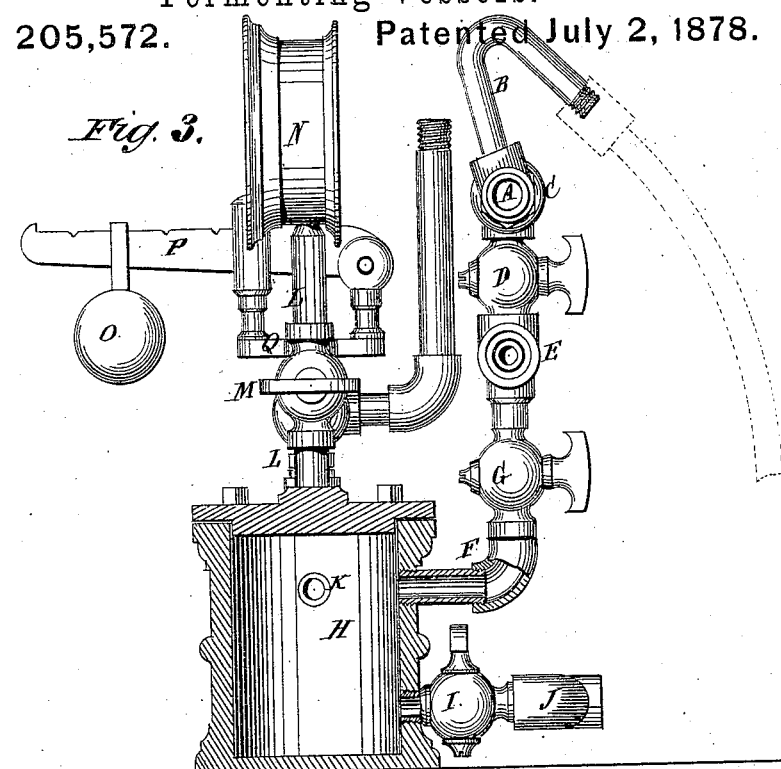
Figure 4:
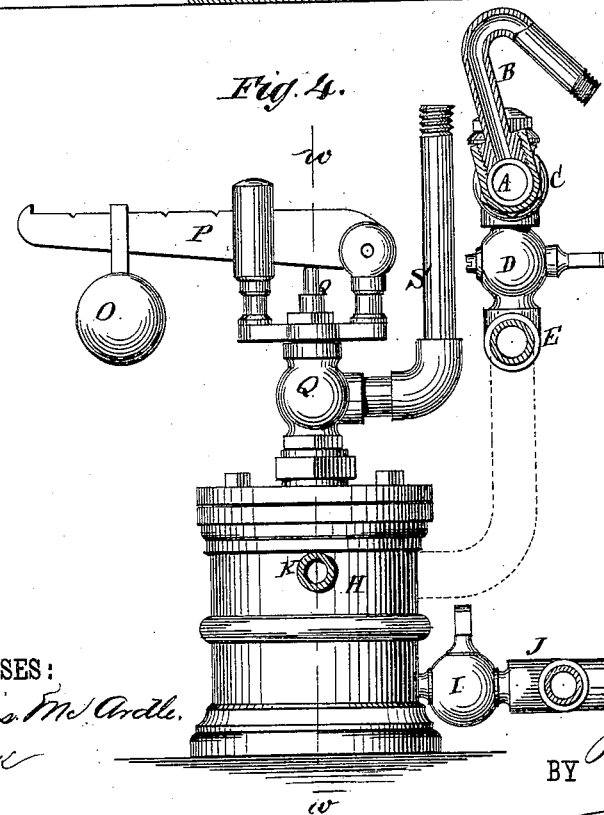

Be it known that I, JOHN M. PFAUDLER, of Rochester, in the county of Monroe and State of New York, have invented a new and Improved Pressure-Regulator for Fermenting Liquids, of which the following is a specification:

Figure 1, Sheet 1, represents a partly-sectional front or side elevation of my improved pressure-regulator, the section being taken on the line *w w* of Fig. 4, Sheet 2. Fig. 2, Sheet 1, is a detail section of the check-valve in one of the section-pipes. Fig. 3, Sheet 2, is an end elevation of the pressure-regulator, partly seen in section on the line *x x* of Fig. 1. Fig. 4 is a vertical cross-section of the same, taken on the line *y y* of Fig. 1.

Similar letters of reference indicate corresponding parts.

The invention has for its object to provide an effective apparatus for equalizing the pressure in a series of hogsheads or other vessels containing beer, wines, or other liquids in a state of fermentation, and for regulating the pressure of the gas caused by such fermentation, so that it shall not exceed a certain number of pounds to the square inch previously determined and gaged in the said apparatus.

The invention consists in the combination of one or more section-pipes, each having branch pipes connecting it with one or more fermentation-vessels, and a check-valve, and a stop-cock with a main pipe connected by branch pipes and stop-cocks to intercommunicating cylinders or receivers provided or connected with pressure-gage, safety-valve, and blow-off cocks, as will be hereinafter described and claimed.

A is one of the section-pipes, of which there are one or any number, according to the number of hogsheads or other vessels required to be in operation at the same time. The said vessels are arranged in sections of a certain number—say six—and each connected by a hose to one of the branch pipes B of their common section-pipe A. The latter are attached to one common main pipe, E, and each of them is provided with a stop-cock, D, for shutting off communication with the main pipe E in case of leakage in the fermenting-vessels, or when attaching their hose to the pipes B, or for other purposes. Between the cock D and the pipe B nearest to it the section-pipe A is provided with a check-valve, C, which opens when the pressure in the fermenting-vessels preponderates, and allows the gas to pass off into the main pipe E, but closes in the opposite direction—that is, against a preponderating counter-pressure in the main pipe E. The main E carries off the surplus gas from the several sections to one or more cylinders or reservoirs, H, by means of one or more branch pipes, F, each of which is provided with a stop-cock, G. The cylinders H have blow-off cocks I at the bottom, which cocks may be connected to a common discharge-pipe, J, and opened to cleanse the cylinders of any sediments which may have been carried over into the cylinders by a sudden rush of gas from extraordinary fermention in any of the sections.

Communication is kept up between the upper part of the cylinders H by the pipe K, which is connected by a pipe, L, having a stop-cock, M, to a manometer, N, or pressure-gage, indicating in numbers of pounds to the square inch the pressure of the gas in the cylinders.

The pressure (generally five or six pounds) at which it is desired to carry on the fermentation is gaged and regulated by sliding the weight O on the lever P of the safety-valve Q nearer to or farther from its fulcrum, to correspond with the position of the index of the manometer N at the number on the scale at which it is intended that the valve should open and let out the surplus gas.

The manometer N may be dispensed with, and the pressure adjusted and read off on a scale graduated upon the lever P directly. The safety-valve is attached on top of the cylinder; and to guard against overpressure in case of the valve getting out of order, two or more safety-valves are used, as shown in the drawing.

When using two valves Q they are preferably connected together by a pipe, R, to discharge through a common exhaust-pipe, S. The fermentation-vessels of each section being all connected by hose to the branch pipes B, and by the latter to their common section-pipe A, without intermediate valves, it is evident that the pressure in them all is equalized by the free access of the gas from one to the other, thus preventing the liability of either of them to burst from overpressure; and when the gas has accumulated sufficiently to cause pressure in excess of that gaged, the check-valve C will open and the surplus of gas pass to the main pipe E, and thence to the cylinders H, where it is stored up until sufficient pressure is attained to raise the safety-valves Q and allow the surplus to escape through the exhaust R S.

By this invention the fermentation can thus be kept operating at a uniform pressure to insure beer of uniform quality, and the hogsheads or other vessels need not be subjected to any more strain than what is necessary to insure the said uniformity.

Having thus described my invention, I claim as new and desire to secure by Letters Patent—

The combination of one or more section-pipes, A, each having branch pipes B, connecting it with one or more fermentation-vessels, and the check-valve C, and stop-cock D with the main pipe E, connected by branch pipe F and stop-cock G to the intercommunicating cylinders or receivers H, provided or connected with pressure-gage N, safety-valve Q, and blow-off cocks I, substantially as and for the purpose set forth.

JOHN M. PFAUDLER.

Witnesses:
JOHN M. KLINGLER,
STEPHEN C. MITCHEL.